(12) United States Patent
van Strijp et al.

(10) Patent No.: US 6,842,268 B1
(45) Date of Patent: Jan. 11, 2005

(54) PRINTING OF DIGITAL COLOR IMAGES WITH LOCALLY ADJUSTED HALF-TONING

(75) Inventors: Romeo Maria van Strijp, Venlo (NL); Ronald Fabel, Venlo (NL)

(73) Assignee: OCE-Technologies B.V., Venlo (NL)

( * ) Notice: Subject to any disclaimer, the term of this patent is extended or adjusted under 35 U.S.C. 154(b) by 761 days.

(21) Appl. No.: 09/626,421

(22) Filed: Jul. 26, 2000

(30) Foreign Application Priority Data

Jul. 26, 1999 (NL) .............................. 1012708

(51) Int. Cl.⁷ .............................................. H04N 1/405
(52) U.S. Cl. ..................... 358/3.06; 358/3.15; 358/534
(58) Field of Search .............................. 358/2.99, 3.01, 358/3.13, 3.15, 3.06, 515, 534

(56) References Cited

U.S. PATENT DOCUMENTS

| | | | |
|---|---|---|---|
| 4,583,116 A | | 4/1986 | Hennig et al. |
| 4,930,007 A | | 5/1990 | Sugiura et al. |
| 5,032,853 A | | 7/1991 | van Stiphout et al. |
| 5,970,178 A | * | 10/1999 | Lin .............................. 382/251 |

FOREIGN PATENT DOCUMENTS

| EP | 0110353 A | 6/1984 |
|---|---|---|
| EP | 0889641 A | 1/1999 |

OTHER PUBLICATIONS

Wong K.Y. et al. "Adaptive Switching of Dispersed and Clustered Halftone Patterns for Bi–Level Image Rendition" SID International Symposium, Digest of Technical Papers, Society for Information Display, Los Angeles (US), 1977, bladzijden 124–135, XP000605139.

* cited by examiner

Primary Examiner—Thomas D. Lee
(74) Attorney, Agent, or Firm—Birch, Stewart, Kolasch & Birch, LLP

(57) ABSTRACT

A method of and apparatus for printing color images by the superimposition of a number of separations, using a first half-tone technique optimized for surface reproduction, such as dithering, and a second half-tone technique, differing from the first and optimized for edge reproduction, such as thresholding with error diffusion, is disclosed. The second half-tone technique is used in edge transitions for pixels of a separation which substantially influences the edge transition, and the first half-tone technique is used outside the edge transition. And the first half-tone technique is used throughout in the case of pixels of a separation which provide no or minimal contribution to the edge transition.

19 Claims, 2 Drawing Sheets

PRINTING OF DIGITAL COLOR IMAGES WITH LOCALLY ADJUSTED HALF-TONING

FIELD OF THE INVENTION

The invention relates to a method of and apparatus for printing colour images.

BACKGROUND OF THE INVENTION

Typically a colour image is formed by superimposition of a number of digitally specified separations or printing colour images.

In a method of this kind, a colour image is represented by pixels arranged in a rectangular raster, the values of the pixels specifying a colour in the form of a co-ordinate value in a colour space.

In the production of a print from a colour image of this kind, digital image data are first calculated which (for each pixel) specify (in a colour space) a co-ordinate value adapted to the ink colours of a printing unit, hereinafter referred to as the printing colours. This coordinate value specifies the degree of coverage for each of the printing colours, conventionally expressed in eight binary bits. Many colour printing units work with the printing colours yellow, magenta, cyan and black (Y, M, C, K) but there are also printing units which contain more printing colours, usually the colours already mentioned and in addition red, blue and green (R, B, G). A partial image formed by the values of the pixels of a separate printing colour is usually referred to as a separation.

The digital image data thus calculated are then used to control a printing unit. The different separations are successively converted to an ink image and fixed in combination on an image support, usually a sheet of paper, whereafter they jointly form a multi-colour image by optical mixing of the printing colours.

In the calculation of the digital image data, in the first instance there is calculated for each separation and for each pixel therein a value which specifies a degree of coverage and hence an optical density in eight binary bits, i.e. 256 possible values. The most usual printing units, such as electrophotographic printers or ink jet printers, however, can only process two pixel values, namely "ink" and "no ink" or 0 and 1. The 8-bit pixel values should therefore be converted to binary pixel values which can be processed by a printing unit.

Various techniques are available to convert multi-value pixels into binary pixel values without losing a shaded overall impression of the printed image. These techniques all make use of the integrating power of the human eye whereby images built up of a sufficient number of small dots are perceived by the observer as a uniform surface. These techniques are generally referred to by the collective name of "half-tone processing". Known techniques are dithering, in which regular patterns of black and white pixels are printed, and thresholding, in which only pixels having a relatively high value are actually printed. The latter technique is frequently supplemented by error diffusion, in which rounding-off errors are passed on to pixels which are still to be treated.

The dithering technique is very suitable for reproducing uniform surfaces, but less suitable for sharp edges because of its inherently low resolution.

The thresholding technique gives good reproduction of sharp transitions and even emphasises them to some extent, but uniform surfaces having a degree of coverage between maximum and minimum values are forced towards one of two extreme values without shading.

The combined technique of thresholding and error diffusion is very suitable for sharp transitions. Uniform surfaces are also reasonably reproduced thereby although frequently with some noise. However, it does not approach the quality level of dithering.

The said techniques are described in detail in the literature and therefore require no further explanation.

For good reproduction of all kinds of image information it is therefore desirable to be able to use both techniques, depending on the local image type. This is described, for example, in U.S. Pat. No. 4,930,007 to Sugiura et al.

In the method known from this patent, a colour image is divided into small blocks of pixels, and of each block the predominant type of image is determined from the K-signal (the "black" signal; this signal usually defines the image content most strongly). In blocks where an edge predominates thresholding is used for all the separations while in the other blocks dithering is used for all the separations. In this way, edges in the image are printed with the technique which can best reproduce the sharp transitions so that the image quality is improved.

In this method, therefore, all the separations are treated in the same way, i.e. with the same half-tone technique. However, this can lead to unwanted effects. This will be explained by an example.

At a colour transition at least one of the separations will frequently extend over the transition. For example, if a blue surface (formed by superimposition of magenta and cyan) adjoins a red surface (formed by magenta and yellow), then the cyan and the yellow separations will each contain a sharp edge and the magenta separation of one surface will extend into the other, possibly with different degrees of coverage. The cyan separation and the yellow separation, which dominate the colour transition, then benefit from the edge-strengthening effect of thresholding, but for the magenta separation, which has no or practically no transition and hence more of a surface characteristic thresholding is precisely the wrong choice, because thresholding is less suitable for surface reproduction. Since the adjoining pixel blocks are treated with dithering which is the optimum for surfaces, there is introduced into the magenta image a density transition which does not correspond to the original image and therefore has a negative effect on the print quality.

SUMMARY OF THE INVENTION

An object of the invention is to provide a solution to the problem of printing colour transitions sharply and faithfully.

To this end, according to the invention, in an edge transition there is selected, for each pixel and for each separation, a half-toning technique which is optimised for surface reproduction or a half-tone technique which is optimised for edge reproduction on the basis of the extent to which the local transition intensity of the edge transition in that separation influences the edge transition at the location of the pixel concerned.

The effect of this is that the half-tone method is optimised in each separation separately for the type of image information to which the pixel for processing belongs. As far as possible, disturbing artefacts are limited as a result. According to the invention, in addition, the choice is made for each pixel separately, so that the method can satisfactorily follow local effects.

The pixels for which the described selection is made are situated in a narrow strip along the edge transition, preferably a strip of 3 pixels width maximum.

According to one embodiment of the invention, a half-tone technique optimised for edge transition is used in an edge transition for pixels of that separation which dominates the edge transition, and a technique optimised for surface reproduction is used outside the edge transition. Meanwhile, for pixels of a separation which provides no contribution or a minimal contribution to the edge transition, the half-tone technique optimised for surface reproduction is used throughout.

The contribution of a separation to a colour transition is measured by the influence it has on the image to the human eye.

In a further embodiment of the invention, as a second assessment, in addition the local transition intensity of the edge transition is examined for each separation and the half-tone technique optimised for edge reproduction is used to process all the separations which exceed a predetermined value at the colour transition, and otherwise they are processed with the half-tone technique optimised for surface reproduction. In this way, therefore, pixels which belong to the non-defining separation can nevertheless be processed with the half-tone technique optimised for edge reproduction if their transition intensity is high.

It should be noted that this second assessment, whereby pixels of a separation other than the dominant separation are nevertheless processed with the half-tone technique optimised for edge reproduction, is carried out only in that area which has already been identified as edge in the first assessment. This prevents small disturbances in the image, such as noise, from being amplified.

Apart from the above-described problems with the half-tone processing, colour transitions are frequently also negatively affected by register errors in the printing system.

In printing units, register, i.e. the mutual location of the separation images, is a critical factor. Since printing units usually contain mechanical systems for superposing the separations, the mechanical tolerances of these systems will always cause a small error in register. Due to the very high resolution of the image signals, this can result in visible disturbances in the printed image.

One case of disturbance, for example, is that colours which should adjoin one another are printed at a (slight) distance from one another. The white paper is then visible between the colours.

A register error can also cause one of the separations to be shifted in the case of a sharp boundary in a colour surface built up from a number of separations, so that that colour becomes visible as a deviating edge along the boundary.

In the graphics world, techniques are known to mask disturbances due to register errors by adjusting the image signals. To this end, at a transition between two colours, the colour which is perceived as the lightest, hereinafter referred to as the non-dominant colour, is continued over a short distance in the area of the other, the dominant colour. Since the non-dominant colour is outweighed by the dominant colour, the former is not visible or is practically invisible in the overlap area. If separations shift with respect to one another due to a register error, any open area remains to be covered by the non-dominant colour, and the register error is inconspicuous. In the colour printing industry this technique is e.g. known as "trapping".

An adjustment of this kind is described, for example, in U.S. Pat. No. 4,583,116 to Hennig et al. In this known method, for a contour or boundary between two colours, the separation defining the contour is determined. This separation remains unchanged while for the other separations the values of the pixels situated in a narrow strip along the contour on the dark side thereof are replaced by the values of the pixels which adjoin the contour on the light side. Thus the lighter colour appears as if it were spread out a short distance beneath the dark colour while the other separations on the dark side of the contour are pushed back somewhat. The conversion of image data adapted by trapping to binary image signals suitable for a printing device is not described in the citation.

The method according to the invention can be combined to excellent effect with trapping. If the method according to the invention is simply carried out after the trapping operation, the area spreads of a non-defining separation as created in the latter process are thresholded only along their outer edge and then only if the outer edge forms a strong transition. Consequently, the non-defining separation is dithered at the position of the edge transition so that a neat connection is obtained.

In an alternative embodiment, trapping and half-toning can be integrated, the area spreads made in trapping being automatically completely dithered.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The invention will now be explained with reference to a non-limitative exemplified embodiment with reference to the accompanying drawings wherein.

DETAILED DESCRIPTION OF THE PREFERRED EMBODIMENTS

Figure 1:
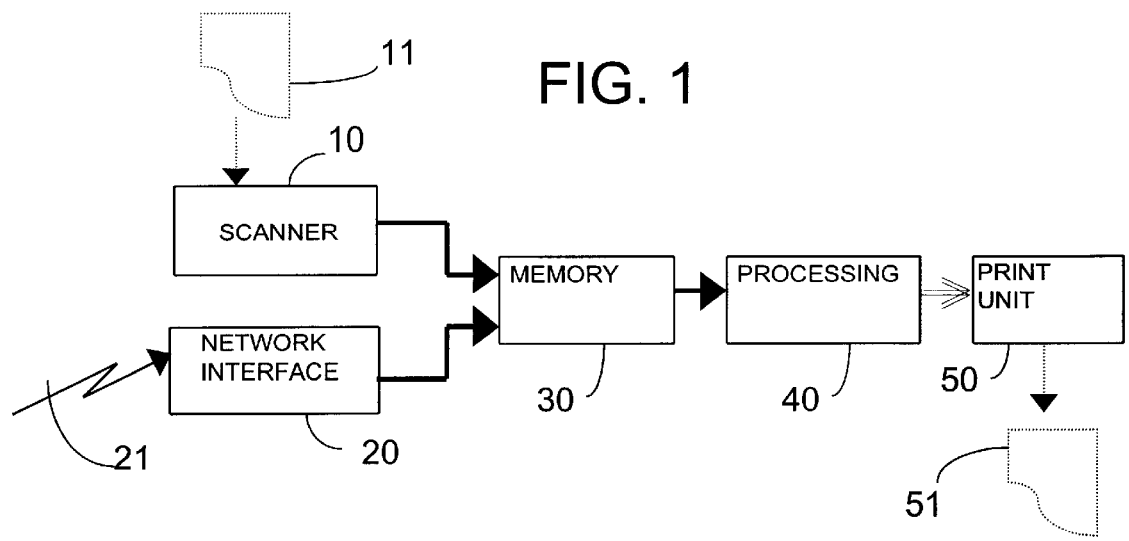
FIG. 1 is a diagrammatic illustration of the relevant parts of a digital copying and printing machine for colour images according to the invention.

FIG. 1 is a diagrammatic illustration of the relevant parts of a digital copying and printing machine for colour images in accordance with the invention. A scanner 10 is connected to a memory 30 for storing therein digital image data which the scanner generates during the scanning of a document 11. A network interface 20 is also connected to the memory 30 for the storage therein of digital image data which the network interface 20 generates when processing print files which are sent via a digital network 21, for example from a workstation (not shown). The memory 30 is connected to a processing unit 40 which can read out and process the image data from the memory 30. The processing unit 40 is in turn connected to a printing unit 50 to deliver processed image data thereto.

The scanner 10 and the network interface 20 deliver digital image data in the form of values of pixels, i.e. image dots which are placed in a rectangular grid and which describe the image. For each pixel, the light values in the colours red, green and blue (RGB) are specified therein in accordance with the eight bits per colour convention.

Scanners and network interfaces are generally known from the literature and are therefore not described in detail here.

In a processing unit 40 an image data file is made suitable for printing via printing unit 50 on an image support, usually a sheet of paper. A print 51 thus forms.

The digital image data delivered to the printing unit 50 are in the form of pixel values which for each pixel of the image specify the coverage with ink or toner powder for the ink/toner colours of the printing unit (hereinafter referred to as "printing colours"). Usually it is only possible to achieve two coverage values, i.e. covered or uncovered, so that a binary value (1 or 0) is sufficient for each colour. This is indicated in FIG. 1 by showing the arrow representing the data communication between the processing unit 40 and the printing unit 50 in a different way from that between the other units in which the 8-bit representation is used.

Various kinds of printing units are known from the literature. Most of them work with the printing colours cyan, magenta, yellow and black (CMYK). There are also systems which have red, green and blue as printing colours in addition to the latter colours. The best known printing techniques adapted to use in printing units are electrophotographic systems, ink jet systems and direct-inductive systems. Systems in accordance with these techniques are generally known from the literature. In particular, an example of a system according to the direct-inductive technique is described in U.S. Pat. No. 5,032,853 to van Stiphout et al.

Figure 2:
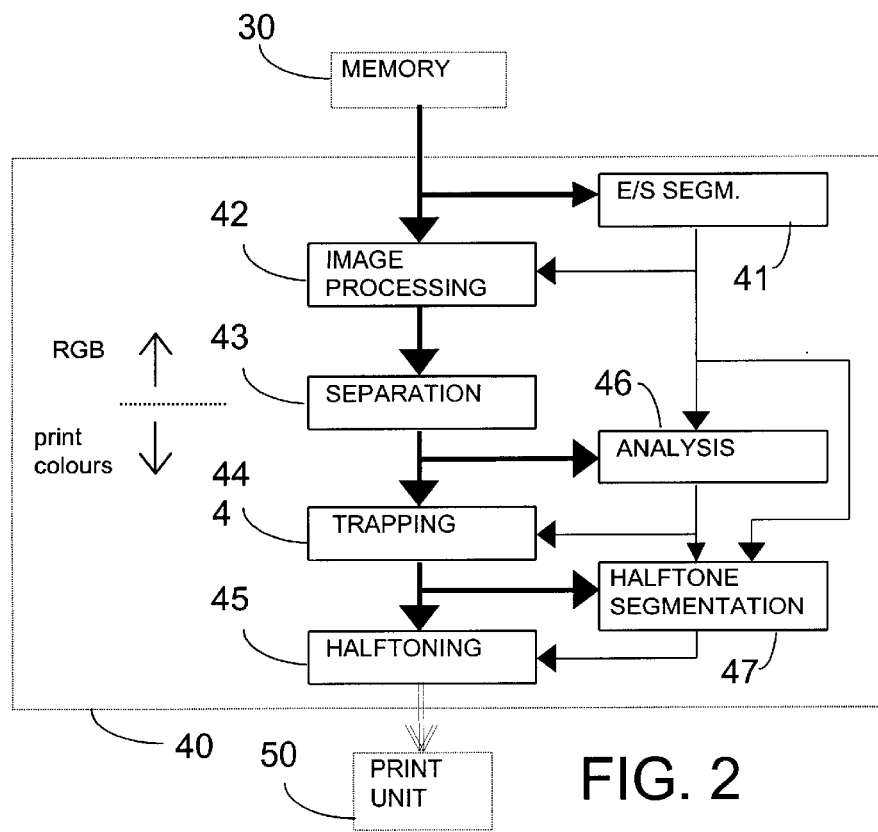
FIG. 2 is a block schematic of a processing unit according to the invention.

The processor unit 40 will now be described in greater detail with reference to FIG. 2.

The memory 30 is read out in accordance with image lines, i.e, rows of contiguous pixels of the image. The read-out image data are successively processed in an image processing module 42, a separation module 43, a trapping module 44 and a half-tone module 45, after which they are passed to the printing unit 50. An edge/surface recognition module 41 receives the image data directly from the memory 30 and calculates control signals therefrom, which it delivers to the image processing module 42, an analysis module 46 and a half-tone segmentation module 47. The analysis module 46 also receives image data from the separation module 43 and itself delivers control signals to the trapping module 44 and the half-tone segmentation module 47. In addition to the said control signals from the edge/surface recognition module 41 and the analysis module 46, the half-tone segmentation module 47 also receives image data from the trapping module 44 and in turn delivers control signals to the half-tone module 45. Where necessary for the data flow and the processing operations, buffer memories and shift registers may be present in the circuit according to FIG. 2. Because of the diagrammatic character of the drawing these components are not shown, also because they are not essential to the description of the processing operations.

For each pixel, the edge/surface recognition module 41 determines whether it is in a surface or just at an edge. For this purpose, the change in the pixel values for R, G and B is calculated over a small neighbourhood, e.g. 5×5, and compared with a predetermined threshold value. If the threshold is exceeded, this indicates an edge location. Instead of the R, G and B values it is also possible to use the luminance, although for this purpose a co-ordinate transformation is first necessary. It is then easier to use the intensity of the green signal for the edge determination, since this usually agrees well with the luminance.

The result of this calculation is passed to the image processing module 42, the analysis module 46 and the half-tone segmentation module 47.

The image data are then processed in an image processing module 42 which carries out a locally adjusted filtering and contrast enhancement. These processing operations are generally applied in the technical area of image processing for digital copying machines, but are not essential to the invention and are therefore not discussed in greater detail. Image data delivered by the network interface 20 and hence in principle requiring no further adjustment, are passed without processing. For this purpose they are identified by a label in the data.

By the application of colour theory laws, the colour of each pixel, expressed in RGB values, is converted into the printing colours, more specifically CMYK values, in the following separation module 43. The CMYK image data are then specified as four channels with 8-bit depth.

A raster image which specifies the coverage value of a specific printing colour for all the pixels is termed a "separation".

Other colour specification systems can also be used, such as the 7-colour system already referred to hereinbefore, depending on the printing process used.

The image data of the separations are passed in parallel to the analysis module 46 and to the trapping module 44, which carries out a processing operation intended to compensate for register errors. Register faults of this kind always exist in a mechanical system in which ink images are successively applied to an image support as occurs in a printing unit.

The term "trapping" denotes a technique in which, at places where two colours adjoin one another, the area covered by the least dominant colour is spread out over a very small distance, so that an overlap forms with the most dominant colour. The term "dominant" here denotes the colour which is perceived as the darkest to an observer's eye. In a transition between yellow and blue, for example, yellow is the least dominant and blue the most dominant colour. With trapping, the area covered with yellow is now spread out somewhat so that it overlaps the blue. This is barely visible, because the blue predominates. If there were no trapping, a small register error in which the two colours diverge, would result in an uncovered, hence white, edge, which is very disturbing to the observer. By spreading out the yellow area in the case of trapping, the open space caused by the registered error is still always covered by yellow, and the register error is not perceived at all.

With trapping, in the case of a colour transition at which a dark combined colour adjoins a much lighter or white area, the separations which do not define the colour transition are pushed back somewhat beneath the edge by replacing them by the value of the light edge. As a result, even with a register error, a non-defining colour can thus not be distinctly visible along the edge. An example of this is black text in which the black also contains colour components. A condition for this, however, is that the black has sufficient coverage, otherwise the trapping is visible in the form of fading of the black along the edge.

The distance over which the pixel values are adjusted in the case of trapping depends on the register accuracy of the printing system. A good value for the spread in the case of trapping is frequently 1 to 2 pixels.

The implementation of trapping in the system will now be explained in detail.

The analysis module 46 receives image data of the separations from the separation module 43 and control signals from the edge/surface recognition module 41 and delivers control signals for each pixel to the trapping module 44 and the half-tone module 45.

For each pixel that the edge/surface recognition module 41 recognises as an edge pixel, the analysis module 46 examines which separation defines the dominant colour of the edge. This is possible by comparison of the degrees of coverage of the different separations in that pixel and weighting the same with respect to the influence each colour has on human observation. The separation found is stamped as edge-defining and fed to the trapping module 44 and to the half-tone segmentation module 47.

In response to the control signals, for each separation which is not found to be edge-defining, the trapping module 44 replaces the value of the edge pixel situated on the dark side of the edge, by the value of the nearest pixel situated on the light side of the edge. The effect of this is that the non-dominant printing colour is spread out over a small area. The processed image data from the trapping module 44 are fed to the half-tone module 45 and to the half-tone segmentation module 47.

For each pixel that the edge/surface recognition module 41 recognises as an edge pixel, the half-tone segmentation module 47 calculates the edge intensity in each separation individually. For this purpose, the change in the coverage value is calculated over a small neighbourhood, e.g. 3×3, of the associated pixel. This is compared with a predetermined threshold value. If the threshold is exceeded, the associated separation is indicated as being edge co-defining. The analysis area of the half-tone segmentation can be smaller than that of the edge/surface segmentation, because the image is then made sharper in the meantime and fine rasters are removed by the image processing module 42. It is also intended to limit the effect in the half-tone processing to a small area.

For each pixel, the half-tone segmentation module 47 now feeds the edge defining and edge co-defining separations to the half-tone module 45.

It should be noted that trapping is not always desirable, because it can also cause artefacts due to the fact that overlapping colours can, as a result of the non-dominant colour being spread out, cause unwanted mixed colours, depending on the printing unit used. The system described here can easily be modified to a system without trapping, by setting the trapping spread to 0 pixels. The trapping module 44 thus becomes inoperative but all the other modules remain functional.

The image data processed by the trapping module 44 are then converted by the half-tone module 45 to binary control signals for the printing unit 50. The latter can in fact only print a pixel as "covered" or "uncovered".

Figure 3:
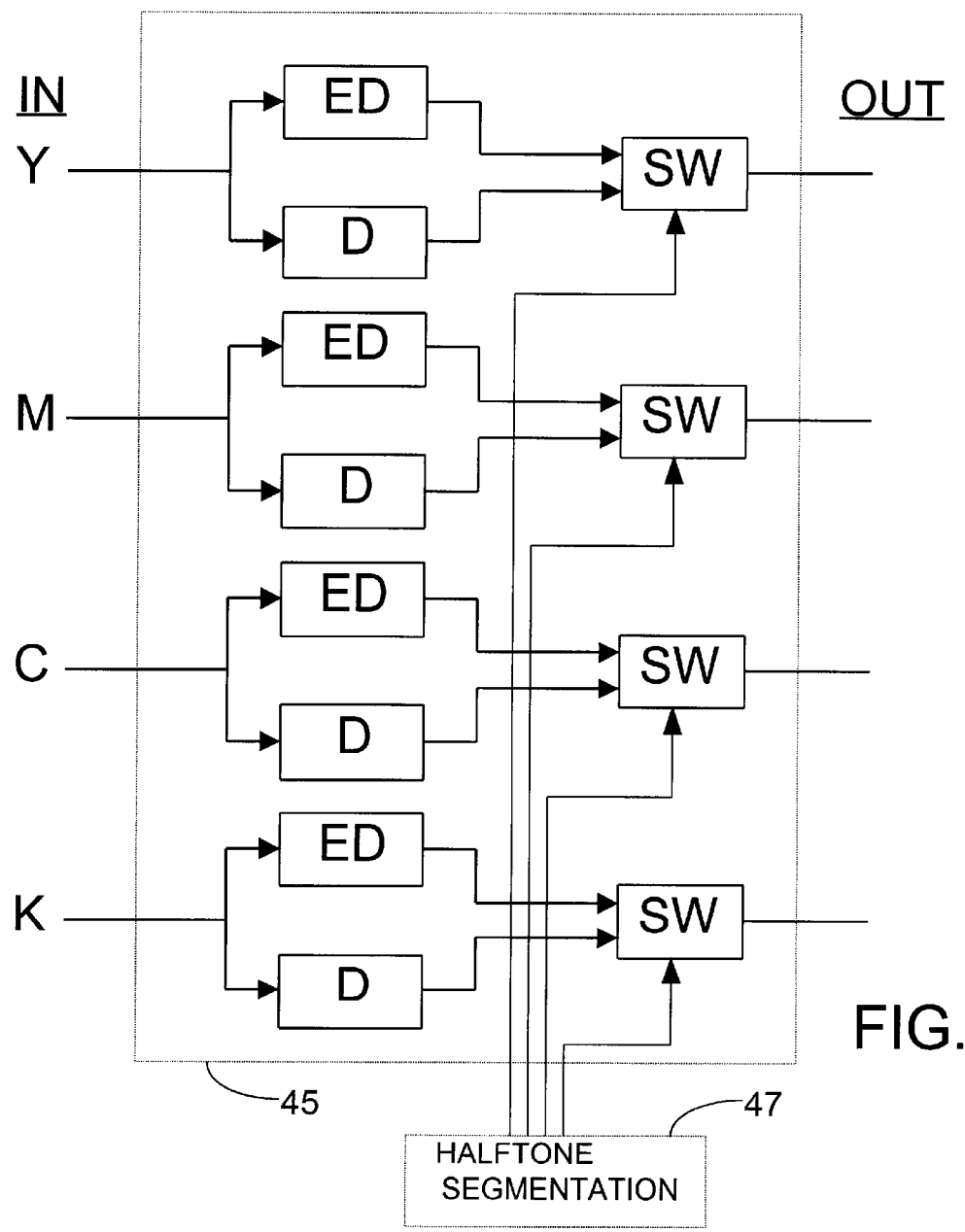
FIG. 3 is a sketch showing the principle of a half toning module according to the invention.

The half-tone module 45 is illustrated diagrammatically in FIG. 3. It comprises a number of circuits, which in principle are identical, each for one of the printing colours, thus four in the example described. Each circuit comprises an input channel which divides into two processing channels ED and D, which then merge into a selection circuit SW, which connects one of the two to the output channel. Each selection circuit SW is connected to the analysis module 46 and receives control signals therefrom.

Figure 4:
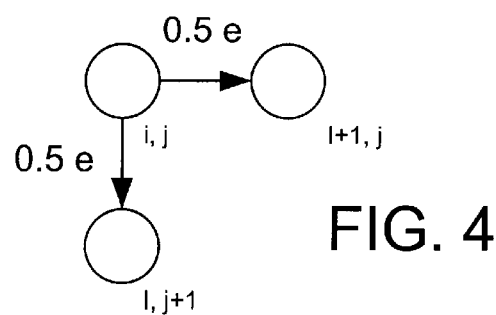
FIG. 4 is an error diffusion diagram according to the invention.

In the processing channel ED, the image data are converted from a multi-value (8 bit) form to a binary form (1 bit) in accordance with the error diffusion principle. According to this principle, the original value of a pixel (the input value) is compared with a preselected threshold value (often half the area, i.e. 128 for 8-bit image data). If the input value is higher than the threshold value, an output value 1 is delivered, otherwise an output value 0. The difference between the input value and the threshold is determined and added to neighbouring pixels which still require conversion. The method described here uses an error diffusion diagram as shown in FIG. 4. In this, the error of the processed pixel (i,j) is half fed to the pixel still to be processed (i+1,j) which in the same row directly adjoins the processed pixel, and half to the pixel still requiring processing (i,j+1) which in the same column immediately adjoins the processed pixel. For this purpose the circuit ED is equipped with suitable electronic components to determine the error and make it available at the correct time. The said components are generally known to the skilled man and are not shown in detail in the drawing. Other error diffusion diagrams can be used.

In the processing channel D, the image data are converted to binary (1 bit) form on the dithering principle. This principle is based on comparison of the original values of a matrix of pixels with a matrix of threshold values, known as a dither matrix. The threshold values in the dither matrix are not identical to one another, but form a sub-set of all the values between the maximum and minimum pixel value. In addition, the dither matrices for the different colour channels differ from one another in order to prevent moire effects in the final print image. If the original value of a pixel in the matrix is greater than the corresponding threshold value, an output value 1 is delivered for that pixel, otherwise an output value 0. The circuit D is equipped with suitable electronic components to make the threshold values available at the correct time and to carry out the comparison. The said components are generally known to the skilled man and are not specified in detail in the drawing. The error diffusion and dithering half-tone methods are also generally known so that a more detailed description is unnecessary here. It is also known that error diffusion is excellent for reproducing edges in an image because it retains sharp transitions in degree of coverage and dithering is precisely very suitable for reproducing uniform surfaces because it reinforces uniformity.

The output value of each pixel is then simultaneously offered to the selection circuit SW which selects and passes one of the two output signals on the basis of a control signal from the half-tone segmentation module 47 which indicates whether the separation for the associated pixel is or is not edge (co)defining. The signal from the ED channel is selected for an edge pixel for each edge-defining or edge co-defining separation, and the signal from the D-channel for the other separations. The signals from the D-channel are chosen for all the separations in the case of pixels not situated at an edge.

In an alternative embodiment, the half-tone segmentation module 47 systematically defines as edge co-defining an edge which has been shifted by trapping, and this is done irrespective of the edge intensity. This prevents the shifted edge from becoming sharper as a result of thresholding and therefore being printed with greater visibility, while it is the object of trapping to reproduce as inconspicuously as possible an area with a non-dominant colour. Since the half-tone segmentation module 47 has obtained information from the analysis module 46 concerning the pixels allocated for trapping and separation, it can distinguish the pixels concerned.

Finally, the image data processed in processor unit 40 are fed to the printing unit, which converts them to a visible image on an image support, such as a sheet of paper. Printing techniques are generally known and again do not form part of the invention. The operation of the printer unit will therefore not be described further here.

The effect of the methods described is that only a printing colour which substantially influences the colour transition is printed by a technique which is optimised in respect of the reproduction of transitions, while the other printing colours are reproduced with a technique which is optimised in respect of uniformity. The result is a print with optimal visual sharpness.

Although the invention has been explained with reference to the above-described exemplified embodiments, it is not limited thereto. It will be clear to the skilled man that other embodiments are possible within the principle of the invention as specified in the accompanying claims.

What is claimed is:

1. A method, of printing colour images in which a colour image is formed by superimposition of a number of separations, comprising:
   generating multi-value image signals for each of a number of separations of a colour image, said image signals specifying degrees of coverage for pixels of a separation, respectively,
   recognising edge transitions in the colour image, which are related to a colour or luminance transition;
   determining a local transition intensity of an edge transition in each separation;
   trapping step including
      determining, for a recognised edge transition, a light and a dark side of the edge transition,
      determining which separation dominates the edge transition,
      adjusting the image signals so as to shift the said recognised edge transition in a separation other than the said dominating separation, so that an overlap forms between the light side of the edge transition in the said other separation and the dark side of the edge transition in the dominating separation; and
   converting the image signals into binary printing signals for pixels of a separation using a first half-tone technique optimised for surface reproduction or a second half-tone technique, differing from the first, optimised for edge reproduction,
   wherein, in an edge transition, one of said first and second half-tone techniques is selected for each pixel and for each separation on the basis of the extent to which the local transition intensity of the edge transition in that separation influences the edge transition at the location of the pixel concerned.

2. The method according to claim 1, wherein the pixels for which the described selection is made are situated in a strip along the edge transition, the strip being a maximum of 3 pixels in width.

3. The method according to claim 1, wherein
   the said second half-tone technique is used in an edge transition for pixels of that separation which dominates the edge transition, and the said first half-tone technique is used outside the edge transition,
   while for pixels of a separation which provides no contribution or a small contribution to the edge transition, the said first half-tone technique is used throughout.

4. The method according to claim 3, wherein, in addition in an edge transition,
   the local transition intensity is determined for each separation, and
   the said second half-tone technique is used for pixels of each separation in which the local transition intensity exceeds a predetermined value, and otherwise the said first half-tone technique is used.

5. The method according to claim 3, wherein said selection is made for pixels which are situated in a strip of three pixels in a range of 1–3 pixels wide along the edge transition.

6. The method according to claim 3, wherein a separation that dominates the edge transition is determined according to which separation is perceived as the darkest to the human eye.

7. The method according to claim 1, wherein the said first half-tone technique is a dither algorithm.

8. The method according to claim 1, wherein the said second half-tone technique is a threshold algorithm.

9. The method according to claim 8 wherein the said threshold algorithm includes error diffusion.

10. The method according to claim 1, wherein the first half-tone technique is automatically used in the step of converting the image signals to binary printing signals in respect of pixels whose corresponding image signals have been adjusted by the trapping step.

11. An apparatus for printing colour images by reference to digital image data which contain values of pixels arranged in a raster, comprising:
    a separation module for generating multi-value image signals for each of a number of separations or printing colour sub-images of a colour image, which image signals specify degrees of coverage for pixels in a separation,
    an edge recognition module for recognising edge transitions in the colour image by reference to the said digital image data, which edge transitions are related to a colour or luminance transition, and determining a local transition intensity of an edge transition of this kind in each separation,
    a half-tone segmentation module for establishing the influence of a local transition intensity of an edge transition in a separation on the colour image,
    an analysis module for determining, by reference to the image signals, for a recognised edge transition, a light side and a dark side of said edge transition and determining which separation dominates the edge transition,
    a trapping module, connected to the analysis module and to the separation module, for shifting the said recognised edge transition in a separation other than that in which the edge transition dominates, by replacing the degree of coverage of a pixel of a said other separation on the dark side of the edge transition by the degree of coverage of a pixel of the same separation on the light side of the edge transition,
    a half-tone module for converting the said multi-value image signals by using a first half-tone technique optimised for surface reproduction, or a second half-tone technique, which differs from the first and which is optimised for edge reproduction, and
    a printing device connected to the half-tone module for forming a colour image on an image support by superimposition of sub-images in accordance with the binary printing signals;
    wherein, in an edge transition, the half-tone module selects one of the said first or second half-tone techniques for each pixel and for each separation on the basis of the extent to which the local transition intensity of the edge transition influences the edge transition in that separation at the location of the pixel concerned.

12. The apparatus according to claim 11, wherein the pixels for which the half-tone module makes the described selection are situated in a strip along the edge transition, the strip being a maximum of three pixels in width.

13. The apparatus according to claim 11, wherein the half-tone module
uses, the said second half-tone technique in an edge transition for pixels of that separation which dominates the edge transition and the said first half-tone technique outside the edge transition, and
uses for pixels of a separation which provides no or a small contribution to the edge transition, the said first half-tone technique throughout.

14. The apparatus according to claim 13, wherein the half-tone module also
uses, the said second half-tone technique in an edge transition for pixels of each separation in which the local transition intensity exceeds a predetermined value, and otherwise uses the said first half-tone technique.

15. The apparatus according to claim 13, wherein the half-tone segmentation module determines which separation dominates the edge transition according to which separation is perceived to be darkest to the human eye.

16. The apparatus according to claim 11, wherein the said first half-tone technique is a dither algorithm.

17. The apparatus according to claim 11, wherein the said second half-tone technique is a threshold algorithm.

18. The apparatus according to claim 17, wherein the said threshold algorithm includes error diffusion.

19. The apparatus according to claim 11, wherein the half-tone module automatically uses the first half-tone technique for pixels of which the corresponding degree of coverage has been adjusted by the trapping module.

* * * * *